United States Patent
Al-kadi et al.

(10) Patent No.: US 11,385,320 B2
(45) Date of Patent: Jul. 12, 2022

(54) LOCALIZATION SYSTEM AND METHOD

(71) Applicant: NXP B.V., Eindhoven (NL)

(72) Inventors: Ghiath Al-kadi, Graz (AT); Ulrich Andreas Muehlmann, Graz (AT); Michael Schober, Graz (AT)

(73) Assignee: NXP B.V., Eindhoven (NL)

( * ) Notice: Subject to any disclaimer, the term of this patent is extended or adjusted under 35 U.S.C. 154(b) by 59 days.

(21) Appl. No.: 17/027,909

(22) Filed: Sep. 22, 2020

(65) Prior Publication Data

US 2021/0103023 A1 Apr. 8, 2021

(30) Foreign Application Priority Data

Oct. 8, 2019 (EP) .................... 19202062

(51) Int. Cl.
- *G01S 5/06* (2006.01)
- *G01S 5/02* (2010.01)
- *H04L 9/40* (2022.01)

(52) U.S. Cl.
CPC .............. *G01S 5/06* (2013.01); *G01S 5/0226* (2013.01); *G01S 5/02585* (2020.05); *H04L 63/0442* (2013.01)

(58) Field of Classification Search
CPC ......... G01S 5/06; G01S 5/02585; H04L 63/04
USPC ........................................................ 342/451
See application file for complete search history.

(56) References Cited

U.S. PATENT DOCUMENTS

| | | |
|---|---|---|
| 2004/0072582 A1 | 4/2004 | Aljadeff et al. |
| 2019/0195981 A1 | 6/2019 | Ding et al. |
| 2019/0294166 A1 | 9/2019 | Hill et al. |

FOREIGN PATENT DOCUMENTS

| | | | | |
|---|---|---|---|---|
| AU | 2015207887 A1 | * | 2/2016 | ......... H04N 21/4826 |
| CN | 107702721 A | | 2/2018 | |
| CN | 108089180 A | | 5/2018 | |
| CN | 106199511 B | * | 7/2019 | |
| KR | 20120038353 A | | 4/2012 | |
| KR | 20170071207 A | | 6/2017 | |
| WO | WO-2019112647 A1 | * | 6/2019 | ............ H04W 64/00 |

OTHER PUBLICATIONS

Großwindhager, Bernhard et al; "SnapLoc: An Ultra-Fast UWB-Based Indoor Localization System for an Unlimited Number of Tags"; IPSN'19, Montreal, QC, Canada—Apr. 16-18, 2019, ACM, New York, NY, USA; 12 pages.

* cited by examiner

Primary Examiner — Harry K Liu

(57) ABSTRACT

In accordance with a first aspect of the present disclosure, a localization system is provided for determining a geographic location of a movable object, the system comprising: a plurality of anchors, wherein each anchor is configured to receive a broadcasted message through an ultra-wideband communication channel; a processing unit configured to determine the geographic location based on differences between the times of arrival of the broadcasted message at the respective anchors, on relative positions of the anchors and on a predetermined orientation of the movable object.

22 Claims, 10 Drawing Sheets

LOCALIZATION SYSTEM AND METHOD

CROSS-REFERENCE TO RELATED APPLICATIONS

This application claims the priority under 35 U.S.C. § 119 of European patent application no. 19202062.6, filed Oct. 8, 2019, the contents of which are incorporated by reference herein.

TECHNICAL FIELD

The present disclosure relates to a localization system for determining a geographic location of a movable object. Furthermore, the present disclosure relates to a localization method for determining a geographic location of a movable object, and to a corresponding computer program.

BACKGROUND

Localization systems often make use of satellite signals. For example, the global positioning system (GPS) is a satellite-based radio navigation system, which provides geo-location and time information to GPS receivers embedded in, or attached to, moving objects (for example vehicles). Such systems can determine the geographic location of a moving object. When embedded in a vehicle, a GPS receiver can for example enable a navigation system.

SUMMARY

In accordance with a first aspect of the present disclosure, a localization system is provided for determining a geographic location of a movable object, the system comprising: a plurality of anchors, wherein each anchor is configured to receive a broadcasted message through an ultra-wideband communication channel; a processing unit configured to determine the geographic location based on differences between the times of arrival of the broadcasted message at the respective anchors, on relative positions of the anchors and on a predetermined orientation of the movable object.

In one or more embodiments, the processing unit is configured to determine said differences by selecting one of said anchors as a reference anchor and calculating the differences between the time of arrival of the broadcasted message at the reference anchor and the times of arrival of the broadcasted message at the other anchors. In one or more embodiments, the times of arrival are based on timestamps which are indicative of a reception time of a predefined marker in the broadcasted message.

In one or more embodiments, the processing unit is configured to receive data indicative of the predetermined orientation of the movable object from an inertial measurement unit.

In one or more embodiments, the plurality of anchors includes three or more anchors.

In one or more embodiments, each anchor is configured to receive a further broadcasted message through the ultra-wideband communication channel, and the processing unit is configured to determine the orientation of the movable object based on the differences between the times of arrival of the broadcasted message at the respective anchors, as well as differences between the times of arrival of the further broadcasted message at the respective anchors.

In one or more embodiments, the broadcasted message includes encrypted content, said encrypted content having been encrypted with a private key, and the processing unit is configured to decrypt the encrypted content using a corresponding public key.

In one or more embodiments, the broadcasted message contains a broadcast timestamp, and the processing unit is configured to discard the broadcasted message if the broadcast timestamp deviates from a time reference by more than a predefined threshold.

In one or more embodiments, the time reference is an internal clock value or the time reference is derived from data received through an out-of-band communication channel.

In one or more embodiments, the processing unit is configured to periodically select one of said anchors as a master anchor for a synchronization process between said anchors.

In accordance with a second aspect of the present disclosure, a localization system is provided for determining a geographic location of a movable object, the system comprising: a receiver configured to receive one or more broadcasted messages and to determine angles of arrival of the broadcasted messages; a processing unit configured to determine the geographic location using said angles or arrival of the broadcasted messages.

In one or more embodiments, the movable object is a vehicle.

In one or more embodiments, a navigation system comprises a localization system of the kind set forth.

In accordance with a third aspect of the present disclosure, a localization method is conceived for determining a geographic location of a movable object, the method comprising: receiving, by a plurality of anchors, a broadcasted message through an ultra-wideband communication channel; determining, by a processing unit, the geographic location based on differences between the times of arrival of the broadcasted message at the respective anchors, on relative positions of the anchors and on a predetermined orientation of the movable object.

In accordance with a fourth aspect of the present disclosure, a computer program is provided, comprising executable instructions that, when executed by a localization system, carry out a method of the kind set forth.

DESCRIPTION OF DRAWINGS

Embodiments will be described in more detail with reference to the appended drawings, in which.

DESCRIPTION OF EMBODIMENTS

Localization systems often make use of satellite signals. For example, the global positioning system (GPS) is a satellite-based radio navigation system, which provides geolocation and time information to GPS receivers embedded in, or attached to, moving objects (for example vehicles). Such systems can determine the geographic location of a moving object. When embedded in a vehicle, a GPS receiver can for example enable a navigation system.

Figure 1:
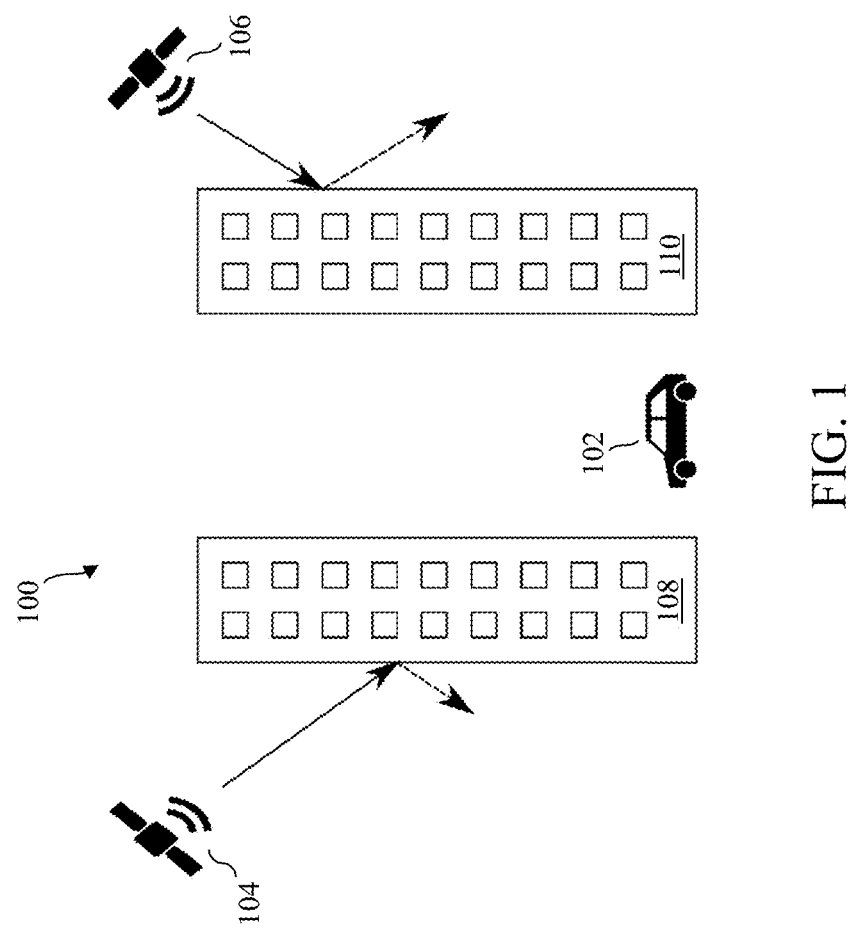
FIG. 1 shows an example of a GPS-based localization system.

FIG. 1 shows an example of a GPS-based localization system 100. The system 100 includes a vehicle 102 whose geographic location should be determined by means of satellites 104, 106. Unfortunately, buildings 108, 110 may block the GPS signals transmitted by the satellites 104, 106. This may negatively affect the performance of the GPS-based localization system 100.

Many cars include a GPS-based navigation system that can be used for determining the current location of a car. Such a GPS-based navigation system typically requires at least 4 signals from different satellites for accurately determining the location of the car. By combining these 4 signals a multilateration-based equation system can be set up for determining the position of the car. For achieving a good localization accuracy, all the signals should be in line-of-sight (LOS) or should at least have a signal propagation time that is very close to the LOS signal propagation time. If the GPS signals are blocked by obstacles, e.g. skyscrapers, the navigation may fail. FIG. 1 shows an example of a car 102 that is not able to receive the signals of two satellites 104, 106 as a result of blocking skyscrapers 108, 110. Also, in underground parking lots or tunnels cars cannot be localized as a result of the blocked GPS signals. This means, for example, that self-driving cars will not be able to park in underground parking lots as a result of a missing reference system for localizing the car. Additionally, even if a GPS signal can be received the localization accuracy is within the meter domain with a common GPS receiver. This might be too inaccurate for some self-driving car applications.

Now discussed are a localization system and a corresponding localization method that facilitate a reliable and accurate determination of the geographic location of a movable object. The movable object can be a car or another vehicle, such as a truck, a forklift truck, a bus, a motorcycle or a bicycle.

Figure 2:
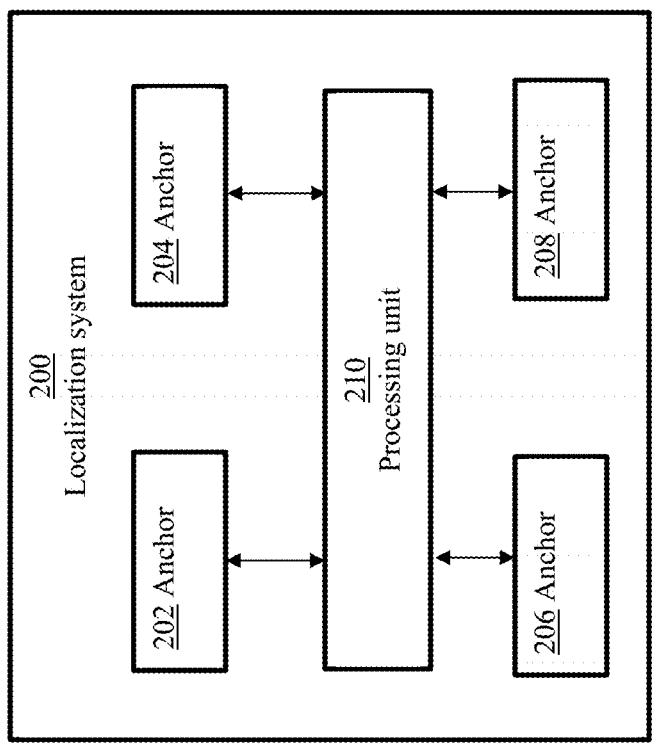
FIG. 2 shows an illustrative embodiment of a localization system.

FIG. 2 shows an illustrative embodiment of a localization system 200. The localization system 200 comprises a plurality of anchors 202, 204, 206, 208 and a processing unit 210. It is noted that the processing unit 210 may be a separate component or it may be integrated into one of the anchors 202, 204, 206, 208. Furthermore, the localization system 200 may be embedded in, or attached to, a movable object, such as a vehicle. The anchors 202, 204, 206, 208 are configured to receive a broadcasted message from an external broadcaster (not shown) through an ultra-wideband (UWB) communication channel. It is noted that anchors are electronic devices that are capable of detecting UWB pulses emitted by UWB devices (e.g. UWB tags). The external broadcaster is a static broadcaster, in the sense that it has a fixed geographic location (i.e., an absolute position). Furthermore, the processing unit 210 is configured to determine the geographic location of the moving object based on differences between the times of arrival of the broadcasted message at the respective anchors 202, 204, 206, 208, on relative positions of the anchors 202, 204, 206, 208 (i.e., the positions of the anchors 202, 204, 206, 208 with respect to each other), and on a predetermined orientation of the movable object. In this way, a UWB-based localization system is realized, which can reliably and accurately determine the geographic location of the movable object. It is noted that the term "movable" refers to an object that can be moved, but which can also be in a stationary state.

Figure 3:
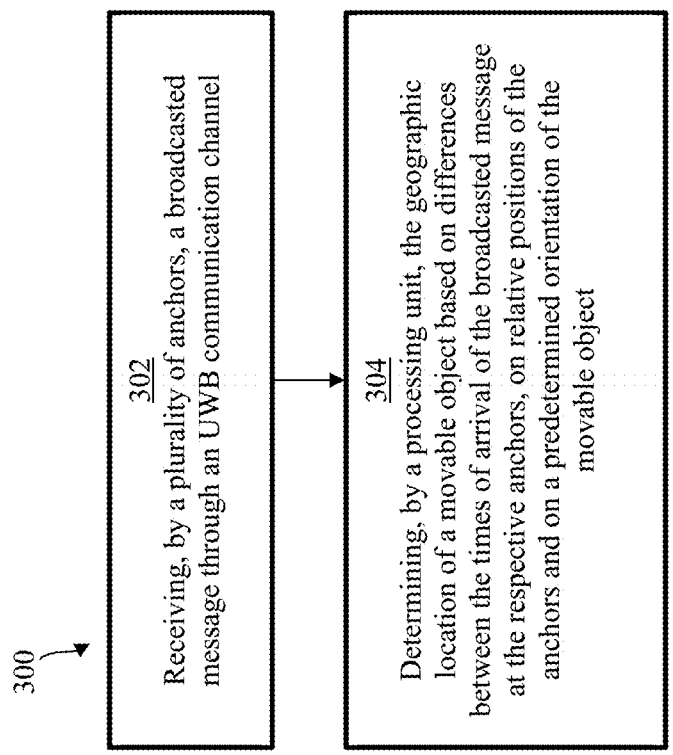
FIG. 3 shows an illustrative embodiment of a localization method.

FIG. 3 shows an illustrative embodiment of a localization method 300. The localization method 300 comprises the following steps: at 302, receiving, by a plurality of anchors, a broadcasted message through an UWB communication channel, and at 304, determining, by a processing unit, the geographic location based on differences between the times of arrival of the broadcasted message at the respective anchors, on relative positions of the anchors and on a predetermined orientation of the movable object. In this way, a UWB-based localization method is realized, by means of which the geographic location of a moving object can be detected reliably and accurately. It is noted that the localization method can at least partially be implemented as a computer program.

In particular, a UWB-based broadcasting system offers an accurate localization service that can be used indoor and outdoor. A UWB broadcasting-only system has the advantage that there may be no need for synchronizing the broadcasting devices. The services are working independently from each other. Using a UWB signal has the advantage of enabling an accurate time difference of arrival (TDOA) measurement that can be used for setting up a multilateration-based equation system. Because of the high bandwidth of the UWB signal, the first path of a signal can be detected very accurately. Furthermore, signal reflections have a minor impact on the localization system. A good first path detection is especially important for indoor localization systems because of the high likelihood of having a multipath channel. Since all the devices of the infrastructure may only need to broadcast, the broadcasting devices can be kept very simple and there may be no need for a receiving unit within the broadcasting devices. Since the broadcasters may not need to be synchronized, the infrastructure costs are also reduced.

In one or more embodiments, the processing unit is configured to determine the differences between the times of arrival of the broadcasted message by selecting one of the anchors as a reference anchor and by calculating the differences between the time of arrival of the broadcasted message at the reference anchor and the times of arrival of the broadcasted message at the other anchors. This results in a practical and effective implementation. Furthermore, in one or more embodiments, the times of arrival are based on timestamps which are indicative of a reception time of a predefined marker in the broadcasted message. This facilitates an accurate determination of the times of arrival.

Figure 4:
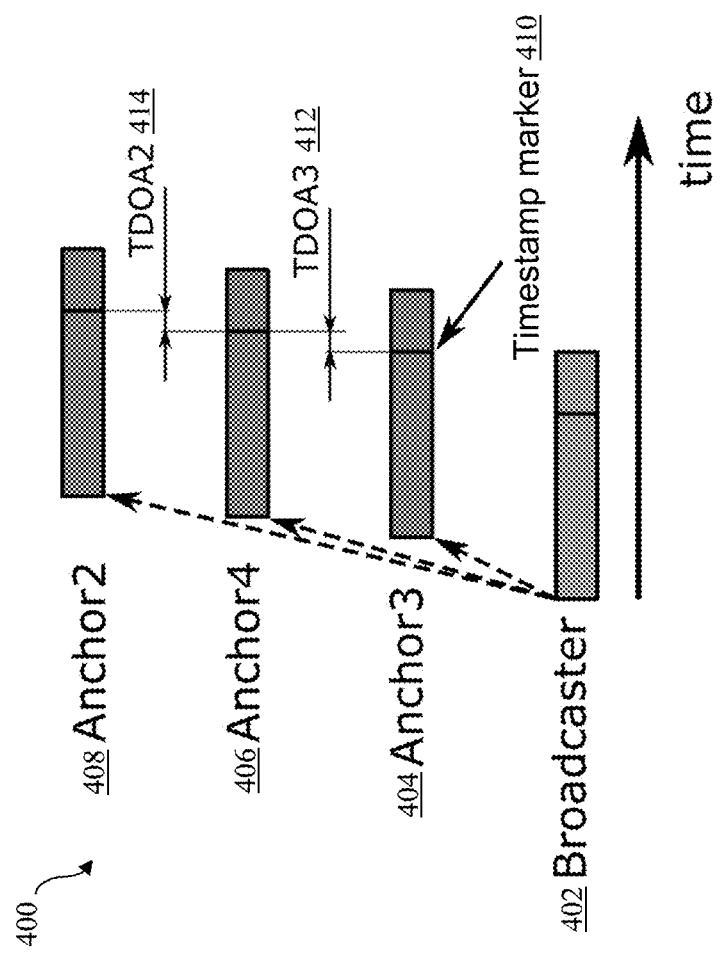
FIG. 4 shows an illustrative embodiment of a TDOA measurement.

FIG. 4 shows an illustrative embodiment of a TDOA measurement 400. When an anchor receives a message, it stores an accurate timestamp that indicates when the message was received. Timestamps received by multiple synchronized anchors can be used for estimating the TDOA between the anchors. FIG. 4 shows a timing diagram of a TDOA measurement based on a broadcasted message and three receiving anchors 404, 406, 408. One of the anchors is selected as a reference anchor. In this case, the anchor 406 (Anchor4) is the anchor that is used as a time reference for the TDOA measurement. Based on the reception time of a predefined maker in the UWB message a time stamp can be stored and compared with the timestamp of the reference anchor.

In one or more embodiments, the processing unit is configured to receive data indicative of the predetermined orientation of the movable object from an inertial measurement unit. The inertial measurement unit may be included in the localization system and/or in the same device or object in which the localization system is included. The use of an inertial measurement unit facilitates the predetermination of the orientation of the movable object. Thus, depending for example on the available sensors within a car, received broadcast timestamps can be combined with data received from an inertial measurement unit (IMU) within the car, which can give a feedback about the orientation of the car.

Figure 5:
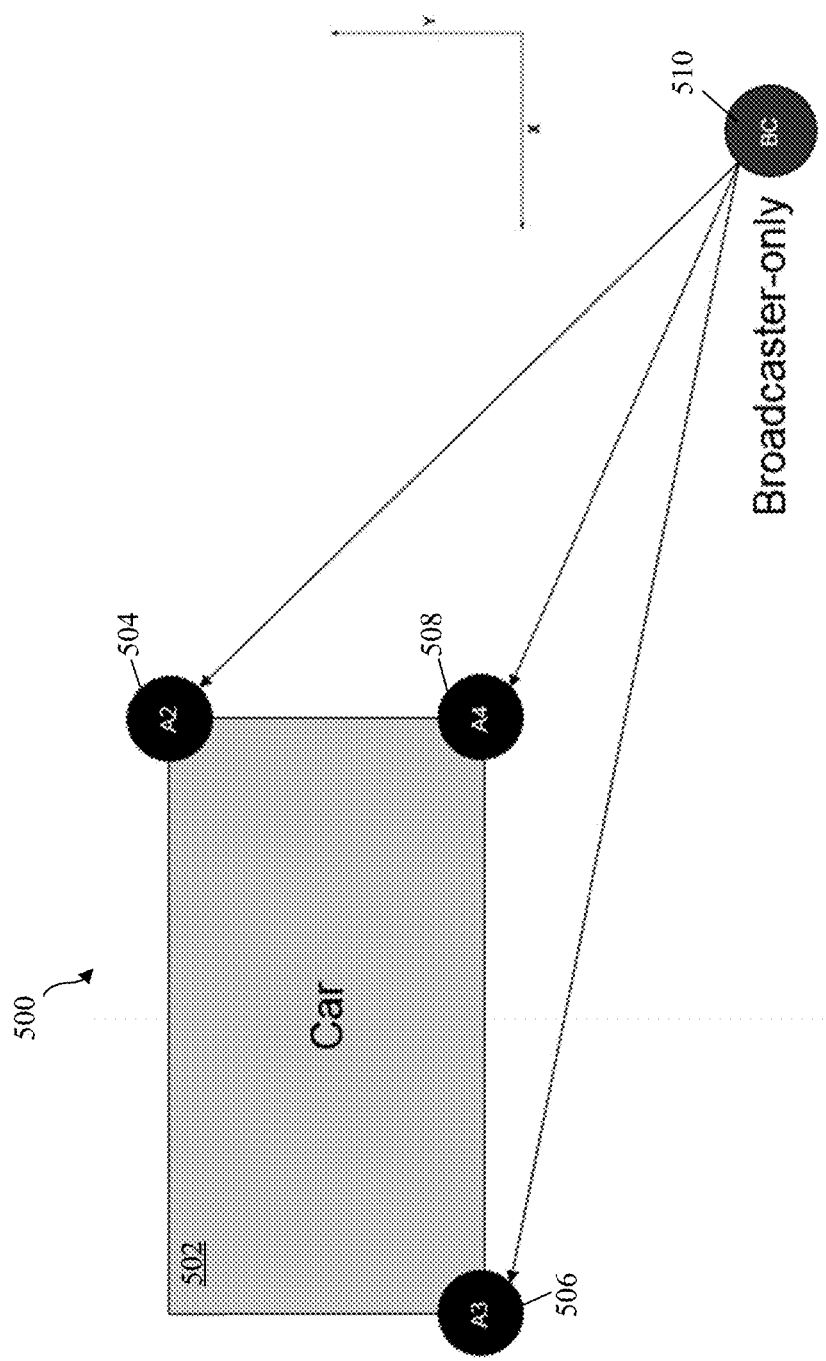
FIG. 5 shows an illustrative embodiment of a UWB-based localization system.

FIG. 5 shows an illustrative embodiment of a UWB-based localization system 500. The localization system 500 comprises a plurality of anchors 504, 506, 508 and a processing unit (not shown) of the kind set forth. The plurality of anchors 504, 506, 508 and the processing unit are included in a car 502. Although the anchors 504, 506, 508 are located at the corners of the car 502 in this schematic overview, the skilled person will appreciate that the anchors 504, 506, 508 may be positioned at more appropriate locations within the car 502. The anchors 504, 506, 508 are configured to receive a broadcasted message from an external broadcaster 510. In particular, a minimum of three anchors 504, 506, 508 may be required for localizing the car 502. If data from more anchors 504, 506, 508 is available a redundancy is added to the system 500, which leads to a better measurement accuracy and fault tolerance. Thus, in one or more embodiments, the plurality of anchors includes three or more anchors. For the sake of simplicity, the borders of the car 502 are oriented along the X and Y axes of the coordinate system. In this example the orientation of the car 502 is known, for example because it had been tracked during the navigation or it was measured by an IMU. The anchors 504, 506, 508 on the car are synchronized either via a wired or wireless synchronization technique. When the broadcaster emits a message, every anchor attached to the car 502 receives the message and generates a receive timestamp. These receive timestamps can be combined with the known relative positions of the anchors 504, 506, 508 and the absolute position of the broadcaster 510. The combined information can be used for setting up an equation system for determining the position of the car 502.

For instance, the following equation system can be set up based on the absolute positions of the anchors and the broadcaster:

$$l_{A4-BC} = \sqrt{(X_{A4}-X_{BC})^2+(Y_{A4}-Y_{BC})^2+(Z_{A4}-Z_{BC})^2}$$

$$l_{A3-BC} = \sqrt{(X_{A3}-X_{BC})^2+(Y_{A3}-Y_{BC})^2+(Z_{A3}-Z_{BC})^2}$$

$$l_{A2-BC} = \sqrt{(X_{A2}-X_{BC})^2+(Y_{A2}-Y_{BC})^2+(Z_{A2}-Z_{BC})^2}$$

$l_{A4-BC}$ ... distance between the Broadcaster and A4 $X_{BC}$ ... X-coordinate of BC
$l_{A3-BC}$ ... distance between the Broadcaster and A3 $Y_{BC}$ ... X-coordinate of BC
$l_{A2-BC}$ ... distance between the Broadcaster and A2 $Z_{BC}$ ... X-coordinate of BC
$X_{A4}$ ... X-coordinate of A4 $X_{A3}$ ... X-coordinate of A3 $X_{A2}$ ... X-coordinate of A2
$Y_{A4}$ ... X-coordinate of A4 $Y_{A3}$ ... X-coordinate of A3 $Y_{A2}$ ... X-coordinate of A2
$Z_{A4}$ ... X-coordinate of A4 $Z_{A3}$ ... X-coordinate of A3 $Z_{A2}$ ... X-coordinate of A2

Some simplifications can be made based on the known geometry of the car and the placement of the anchors. The variables of the length and width of the car are only placeholders. In a real system the anchors might not be placed at the corners of the car; in that case the distances between the anchors need to be considered instead of the car length and width. The Z-coordinates of the anchors are known, because of the known car height and the known anchor placement. Depending on the shape of the car, the anchors can be placed at different heights. In that case, as long as the heights are known to the system, the position of the car can be estimated. In this example, the following simplifications can be made:

$X_{AP3} = X_{AP4} + C_{length}$
$Y_{AP3} = Y_{AP4}$
$X_{AP2} = X_{AP4}$
$X_{AP2} = Y_{AP4} + C_{width}$
$Z_{AP2} = Z_{AP3} = Z_{AP4}$
$C_{length}$ ... length of the car
$C_{width}$ ... width of the car By combining all these equations, the equation set shown below can be derived. The variables $\Delta l_{A3}$ and $\Delta l_{A2}$ are place holders for the TDOAs of A3 compared to A4 and of A2 compared to A4, multiplied with the signal propagation speed. These TDOAs can be measured by the synchronized anchor system. The unknown variables in the equation set are marked with braces. Only two different variables are unknown. This means that the equation system can be solved and that the position of the car can be estimated if its orientation is known.

$$\Delta l_{A3} = \sqrt{((\underline{X_{A4}}+C_{length})-X_{BC})^2+(\underline{Y_{A4}}-Y_{BC})^2+(Z_{A4}-Z_{BC})} - \sqrt{(\underline{X_{A4}}-X_{BC})^2+(\underline{Y_{A4}}-Y_{BC})^2+(Z_{A4}-Z_{BC})}$$

$$\Delta l_{A2} = \sqrt{(\underline{X_{A4}}-X_{BC})^2+((\underline{Y_{A4}}+C_{width})-Y_{BC})^2+(Z_{A4}-Z_{BC})} - \sqrt{(\underline{X_{A4}}-X_{BC})^2+(\underline{Y_{A4}}-Y_{BC})^2+(Z_{A4}-Z_{BC})}$$

Figure 6:
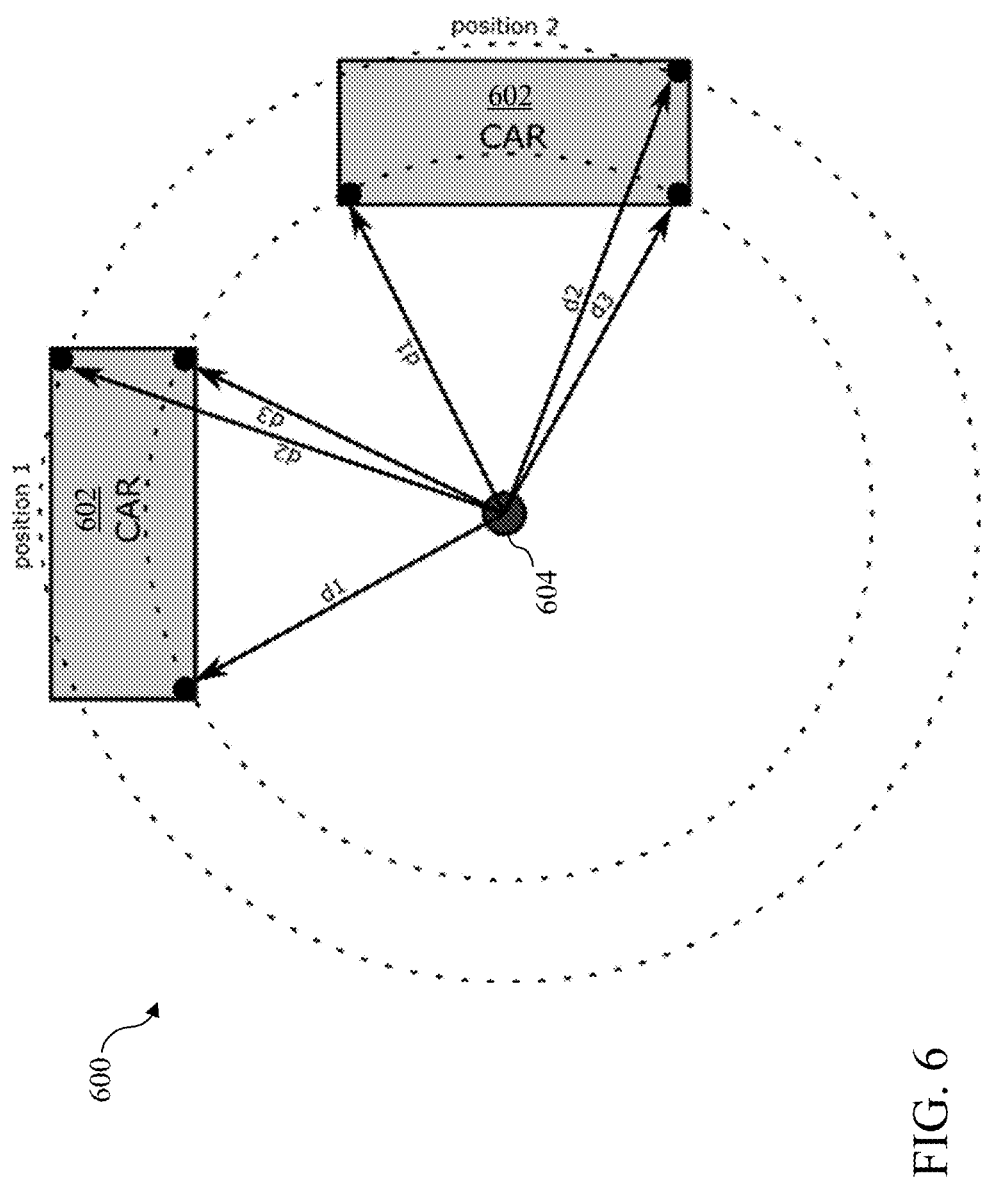
FIG. 6 shows another illustrative embodiment of a UWB-based localization system.

FIG. 6 shows another illustrative embodiment of a UWB-based localization system 600. If the orientation of the car is not known, the equation system cannot be solved because the same TDOAs can lead to multiple positions. FIG. 6 shows an example of a system 600 consisting of a broadcaster 604 and a car 602 with three attached anchors. The distances between the car and the anchors are referred to as d1, d2 and d3. It will be appreciated that the distances between the broadcaster 604 and the anchors are the same even if the car 602 has a different position. Basically, every position of the car 602 with the anchors on the dotted lines will lead to the same distances between the broadcaster 604 and the anchors. As a consequence, the car 602 cannot determine its position without knowing its orientation.

If the orientation is known, the position of the car can be fully determined without ambiguity by using the equations shown above. The equation set should be adapted according to the orientation of the car. For example, if the car is rotated clockwise by 45° the equation set should be adapted as shown below (equations 1-4). These changes should also be considered in the equations shown above. Independent from the adaptations, the equation system still has only two unknown variables, which means that it can be solved.

$$X_{AP3} = X_{AP4} + C_{length} * \cos(45°) \quad (1)$$

$$Y_{AP3} = Y_{AP4} + C_{length} * \sin(-45°) \quad (2)$$

$$X_{AP2} = X_{AP4} + C_{width} * \sin(45°) \quad (3)$$

$$Y_{AP2} = X_{AP4} + C\_width * \cos(45°) \quad (4)$$

For determining the orientation of the car an inertial measurement unit (IMU) can be used, which provides information about the absolute orientation of the car, for example by means of a magnetometer. If such an IMU-based system cannot be used, the car can be located by combining the TDOA measurement of two broadcasters. Thus, in one or more embodiments, each anchor is configured to receive a further broadcasted message through the ultra-wideband communication channel, and the processing unit is configured to determine the orientation of the movable object based on the differences between the times of arrival of the broadcasted message at the respective anchors, as well as on differences between the times of arrival of the further broadcasted message at the respective anchors.

Figure 7:
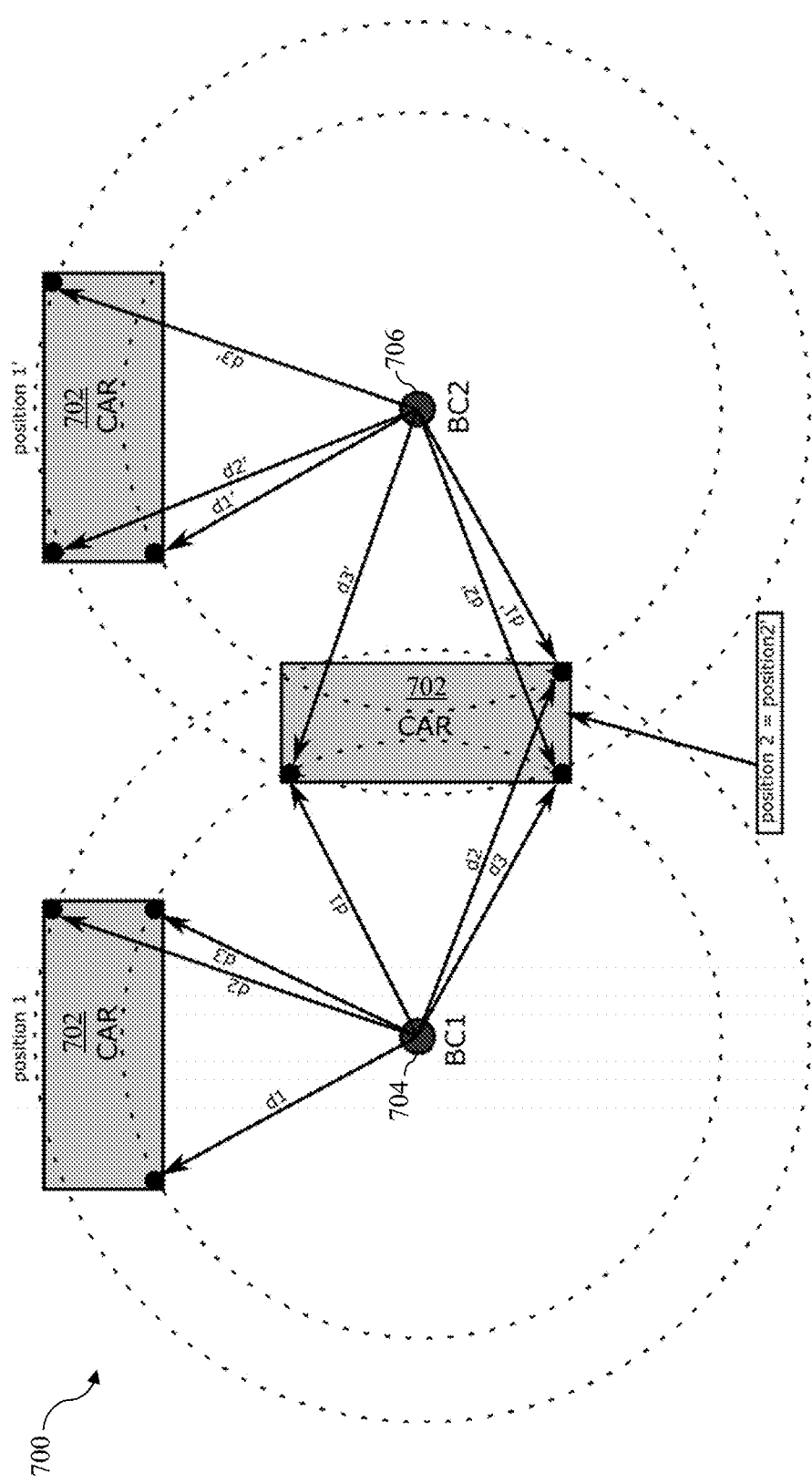
FIG. 7 shows a further illustrative embodiment of a UWB-based localization system.

FIG. 7 shows a further illustrative embodiment of a UWB-based localization system 700. The system includes two broadcasters 704, 706 that are configured to broadcast a message to the three anchors attached to the car 702. If the measurement of two broadcasters 704, 706 are combined, the car 702 can be localized because there is only one intersection of the possible car positions calculated based on the received broadcasted messages. For example, position 1 and position 1' are examples of a calculated position based on a single broadcast. However, these positions do not match. The calculated position 2 and position 2' are the only positions that match. Therefore, only one possible solution exists. This means that the position of the car 702 can be estimated without ambiguity by combining message timestamps of the two broadcasters 704, 706. Since both broadcasters 704, 706 will not be able to transmit exactly simultaneously, the broadcasted messages are received with a time offset. This time offset can be compensated in a postprocessing step, in particular when postprocessing the measured data.

In one or more embodiments, the broadcasted message includes encrypted content, wherein said encrypted content has been encrypted with a private key, and the processing unit is configured to decrypt the encrypted content using a corresponding public key. In this way, it becomes more difficult to tamper with the broadcasted message. Thus, an emitted broadcast can either contain unencrypted content, for example for non-secure applications, or the content can be encrypted to form a root of trust. If encryption is applied an asymmetric encryption scheme should be used, because the cars receiving the broadcasts should only be able to decrypt broadcasts. If a symmetric encryption would be applied, any device able to decrypt broadcasts would also be able to transmit broadcasts, which should be prevented. When an asymmetric scheme is applied, every broadcaster has a different private key for encrypting messages. Furthermore, every car has the public keys of the broadcasters for decrypting the received content. If the broadcasted content also contains a hash and a timestamp, the encrypted content can also be verified and authenticated. If the private key is not known to an attacker, the attacker can only change the ciphertext. If the ciphertext has been changed by an attacker, the decrypted hash and the plaintext will not match anymore. If the broadcasted message also contains a timestamp, the message can be only reused for a predefined amount of time until a car will notice that a message had been reused by an attacker with the purpose of faking the role of a broadcaster. For the comparison of a timestamp, the car can use an internal clock or an external clock as a time reference. Thus, in one or more embodiments, the broadcasted message contains a broadcast timestamp, and the processing unit is configured to discard the broadcasted message if the broadcast timestamp deviates from a time reference by more than a predefined threshold. In this way, the level of security is increased.

Figure 8:
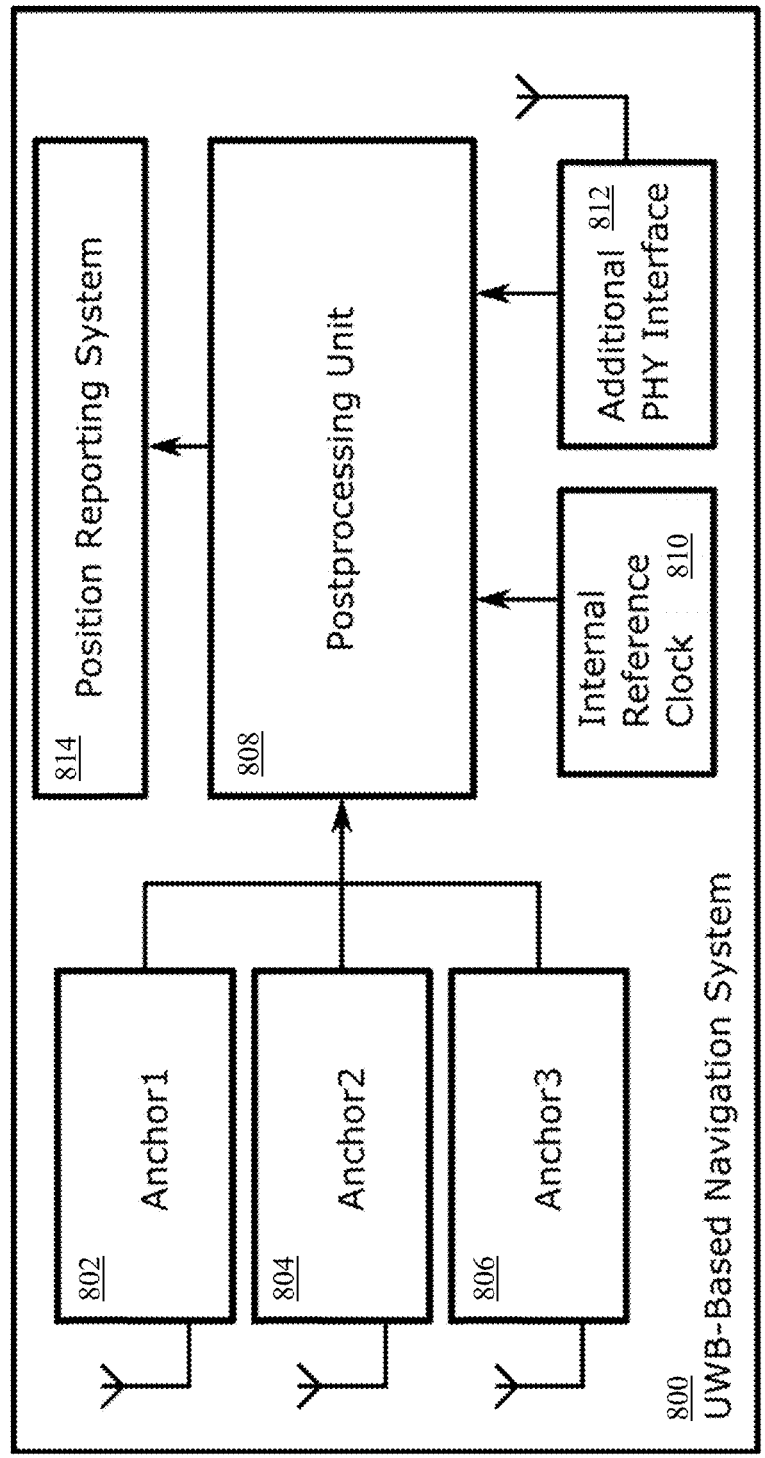
FIG. 8 shows an illustrative embodiment of a UWB-based navigation system.

FIG. 8 shows an illustrative embodiment of a UWB-based navigation system 800. The UWB-based navigation system comprises a plurality of anchors 802, 804, 806, a postprocessing unit 808, an internal reference clock 810, an additional physical layer (PHY) interface, and a position reporting system 814. The reported position can in turn be used by a navigation module (not shown) which calculates a route from the reported position to a destination. The signal output generated by the anchors 802, 804, 806 is processed by the postprocessing unit 808 and the results of said processing are transmitted to the position reporting system 814. Thus, the postprocessing unit 808 represents a processing unit of the kind set forth. If a broadcast is received, it may be decrypted and the timestamp contained in the plaintext may be extracted. This timestamp may be compared with the internal reference clock 810. If the difference between the internal clock value and the broadcasted timestamp is too large, the message is discarded. If the timestamp matches with the internal clock value, the postprocessing unit 808 can start calculating the geographic location of the car. Depending on the data received by the additional PHY interface 812, this PHY interface 812 can be also used for generating a time reference, instead of the internal reference clock 810. Thus, in one or more embodiments, the time reference is an internal clock value of the time reference which is derived from data received through an out-of-bound communication channel (e.g., the additional PHY interface 812). The advantage of using an additional PHY interface 812 is that said time reference will not be affected by the drift of the internal reference clock 810, which leads to a more accurate time basis for the system 800. Thus, an attacker will have less time left for reusing an already existing broadcast.

Figure 9:
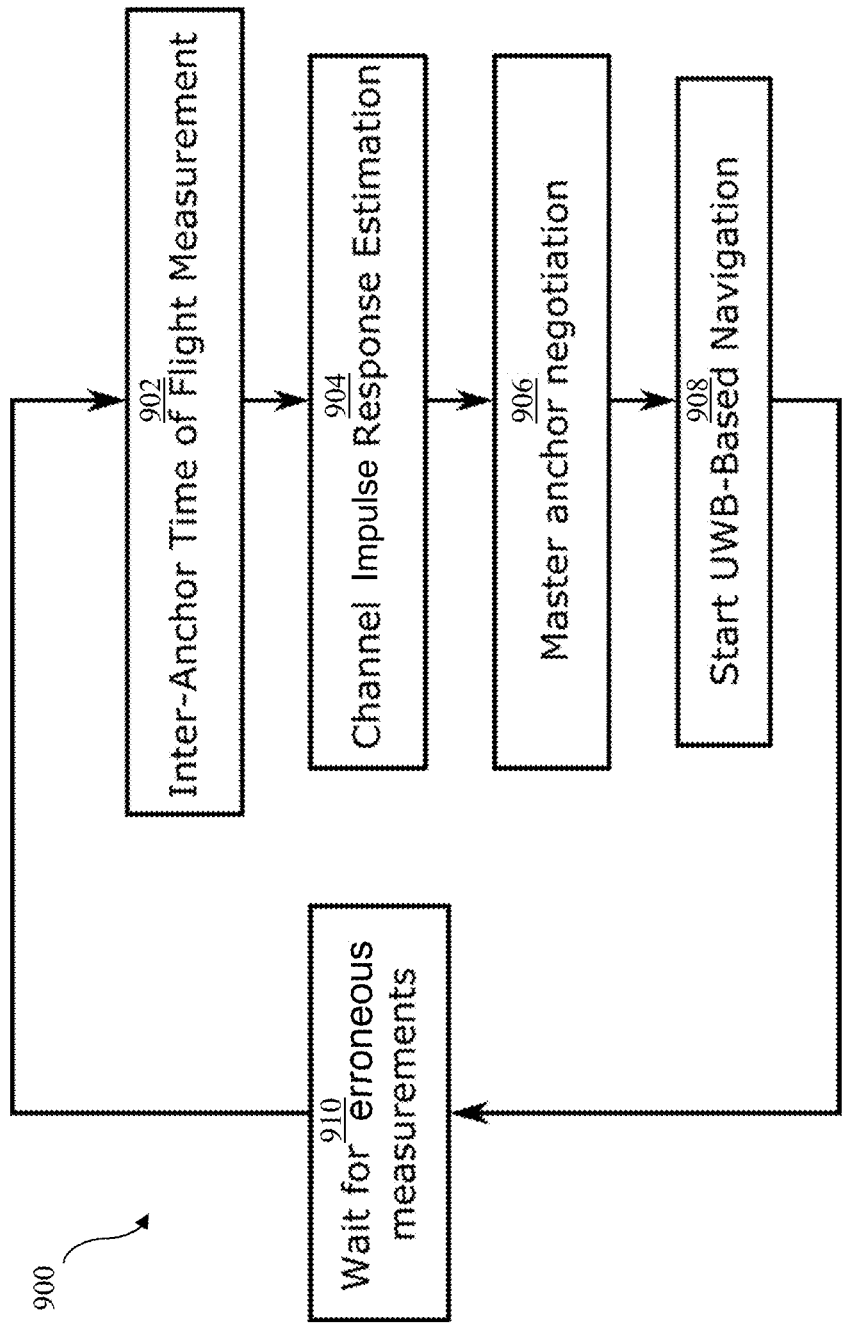
FIG. 9 shows an illustrative embodiment of a state machine for selecting a master anchor.

FIG. 9 shows an illustrative embodiment of a state machine 900 for selecting a master anchor. If the anchors are synchronized wirelessly, it is important that every anchor is in line of sight to the master anchor. For such a wireless synchronization the master anchor typically transmits a time reference beacon to the other anchors. If the beacon cannot be received by an anchor, then this anchor cannot be used for the TDOA measurement because of the drifting clock within said anchor. To avoid this, the processing unit may be configured to periodically select one of said anchors as a master anchor for a synchronization process between said anchors. By periodically selecting a new master anchor, the optimal anchor can be chosen for sending the beacon (i.e., the anchor for which it is likely that the beacon will be received by all other anchors). FIG. 9 shows an example of how the best anchor for the wireless synchronization can be estimated. If too many erroneous measurements occur during the UWB navigation, an inter-anchor TOF measurement is started. Based on the TOF measurement the channels and the corresponding first path propagation delay can be estimated. Based on the known first path propagation time and the channel impulse response (CIR), the best anchor for the wireless synchronization can be determined. If the anchor has been selected, the UWB-based navigation can start again. If too many errors occur during navigation, the channel has most likely changed and the procedure for determining the best anchor for the wireless synchronization should be repeated.

Figure 10:
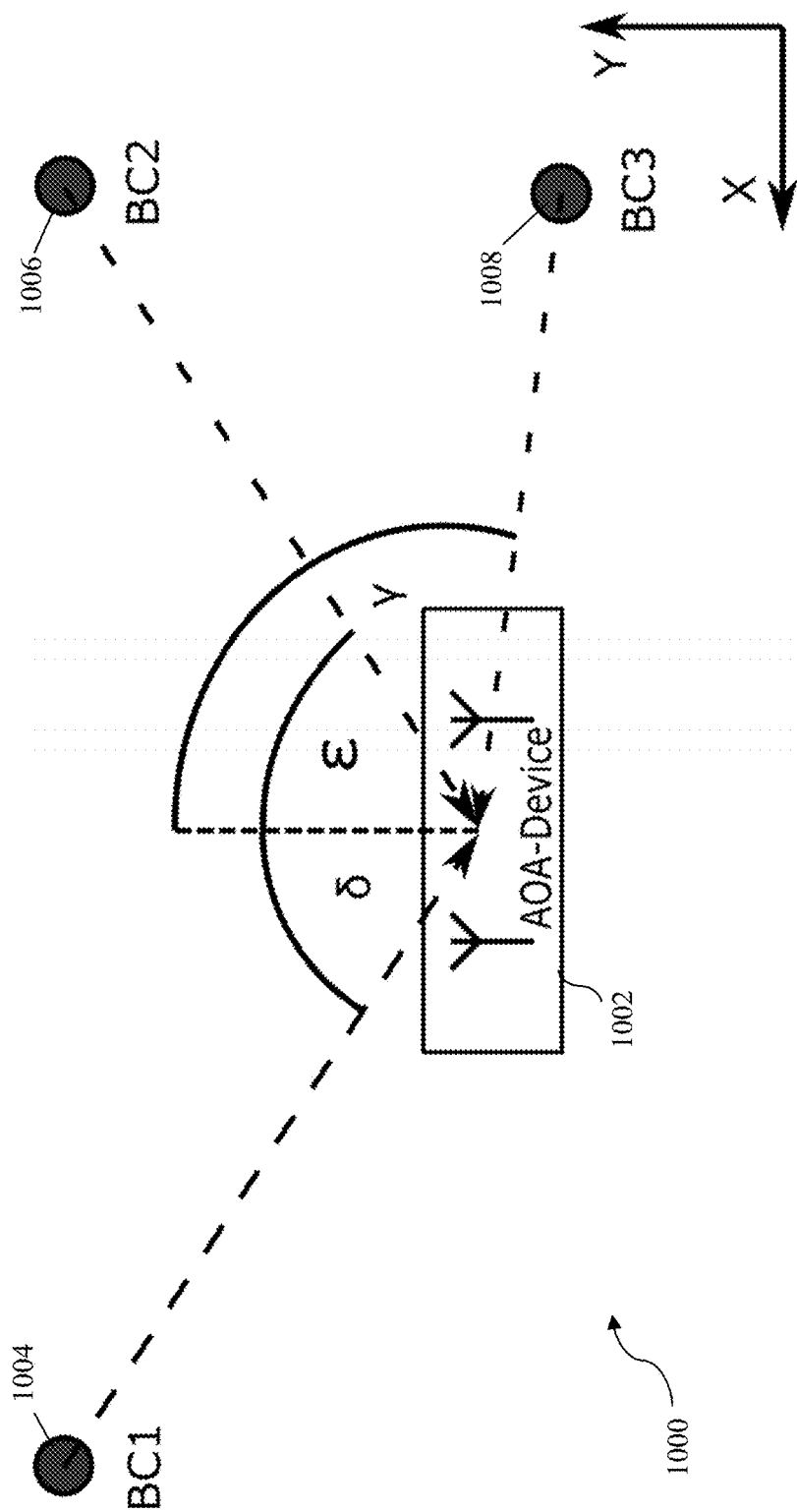
FIG. 10 shows a further illustrative embodiment of a UWB-based localization system.

FIG. 10 shows a further illustrative embodiment of a UWB-based localization system 1000. Instead of a TDOA-based localization system of the kind set forth, an angle-of-arrival (AOA) based localization system may be envisaged. In its basic form, such an AOA-based localization system comprises a receiver configured to receive one or more broadcasted messages and to determine angles of arrival of the broadcasted messages, and a processing unit configured to determine the geographic location using said angles of arrival of the broadcasted messages. This AOA-based localization system represents an alternative solution to the problem of how to facilitate a reliable and accurate determination of the geographic location of a moving object.

FIG. 10 shows an example of an AOA-based localization system 1000, which comprises three broadcasters 1004, 1006, 1008 and an AOA device 1002. The AOA device 1002 receives the broadcasted messages sent by the broadcasters 1004, 1006, 1008 and measures the angle of arrival of the received signals. Using a triangulation technique the position of the AOA device 1002 can be estimated. It is noted that for a two-dimensional angle of arrival measurement the delay of the different broadcasted messages should be taken into account as well. If a two-dimensional angle of arrival measurement is performed, three broadcasters will be needed for solving the ambiguity of every scenario. If a three-dimensional angle of arrival can be measured, one broadcast is sufficient for the localization if the angle of arrival data is combined with data provided by an inertial measurement unit. Otherwise, analogous to the TDOA system, two different broadcasts should be combined and the time shift between the broadcasts should be taken into account as well.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 GPS-based localization system
102 vehicle
104 satellite
106 satellite
108 building
110 building
200 localization system
202 anchor
204 anchor
206 anchor
208 anchor
210 processing unit
300 localization method
302 receiving, by a plurality of anchors, a broadcasted message through an UWB communication channel
304 determining, by a processing unit, the geographic location of a movable object based on differences between the times of arrival of the broadcasted message at the respective anchors, on relative positions of the anchors and on a predetermined orientation of the movable object
400 TDOA measurement
402 broadcaster
404 anchor
406 anchor
408 anchor
410 timestamp marker
412 difference between arrival times
414 difference between arrival times
500 UWB-based localization system
502 car
504 anchor
506 anchor
508 anchor
510 broadcaster
600 UWB-based localization system
602 car
604 broadcaster
700 UWB-based localization system
702 car
704 broadcaster
706 broadcaster
800 UWB-based navigation system
802 anchor
804 anchor
806 anchor
808 postprocessing unit
810 internal reference clock
812 additional physical layer interface
814 position reporting system
900 state machine for selecting a master anchor
902 inter-anchor time of flight measurement
904 channel impulse response estimation
906 master anchor negotiation
908 start UWB-based navigation
910 wait for erroneous measurements
1000 UWB-based localization system
1002 angle-of-arrival device
1004 broadcaster
1006 broadcaster
1008 broadcaster

The invention claimed is:

1. A localization system comprising:
a plurality of anchors disposed within or attached to a movable object, wherein each anchor is configured to receive a first broadcasted message and a subsequent broadcasted message through an ultra-wideband communication channel; and
a processing unit configured to:
determine an orientation of the movable object based on differences between times of arrival of the first broadcasted message at the respective anchors and differences between times of arrival of the subsequent broadcasted message at the respective anchors; and
determine a geographic location of the movable object based on differences between the times of arrival of the first broadcasted message at the respective anchors, on relative positions of the anchors, and on the orientation of the movable object.

2. The localization system of claim 1, wherein the processing unit is configured to determine said differences between the times of arrival of the broadcasted messages at the respective anchors by selecting one of said anchors as a reference anchor and calculating the differences between the time of arrival of the broadcasted messages at the reference anchor and the times of arrival of the broadcasted messages at the other anchors.

3. The localization system of claim 1, wherein the times of arrival of the broadcasted messages at the respective anchors are based on timestamps which are indicative of a reception time of predefined markers in the broadcasted messages.

4. The localization system of claim 1, wherein the plurality of anchors includes three or more anchors.

5. The localization system of claim 1, wherein the broadcasted messages include encrypted content, said encrypted content having been encrypted with a private key, and wherein the processing unit is configured to decrypt the encrypted content using a corresponding public key.

6. The localization system of claim 1, wherein the broadcasted messages contain broadcast timestamp, and wherein the processing unit is configured to discard a broadcasted message if the broadcast timestamp of that broadcasted message deviates from a time reference by more than a predefined threshold.

7. The localization system of claim 6, wherein the time reference is an internal clock value or wherein the time reference is derived from data received through an out-of-band communication channel.

8. The localization system of claim 1, wherein the movable object is a vehicle.

9. A navigation system comprising the localization system of claim 1.

10. A localization method comprising:
receiving, by a plurality of anchors disposed within or attached to a movable object, a first broadcasted message through an ultra-wideband communication channel and a subsequent broadcasted message through the ultra-wideband communication channel;
determining, using a processing unit of a localization system, an orientation of the movable object based on differences between times of arrival of the first broadcasted message at the respective anchors and differences between times of arrival of the subsequent broadcasted message at the respective anchors; and
determining, using the processing unit, a geographic location of the movable object based on the differences between the times of arrival of the first broadcasted message at the respective anchors, on relative positions of the anchors, and on the orientation of the movable object.

11. The localization method of claim 10, wherein the processing unit determines said differences between the times of arrival of the broadcasted messages at the respective anchors by selecting one of said anchors as a reference anchor and calculating differences between times of arrival of the broadcasted messages at the reference anchor and times of arrival of the broadcasted messages at the other anchors.

12. The localization method of claim 10, wherein the times of arrival of the broadcasted messages are based on timestamps which are indicative of a reception time of predefined markers in the broadcasted messages.

13. The localization method of claim 10, wherein the plurality of anchors includes three or more anchors.

14. A computer program product comprising a non-transitory storage medium storing executable instructions that are configured, when executed by a processing unit of a localization system, to cause the localization system to:
receive, from, a plurality of anchors disposed within or attached to a movable object, a first broadcasted message through an ultra-wideband communication channel and a subsequent broadcasted message through the ultra-wideband communication channel;
determine, using the processing unit, an orientation of the movable object based on differences between times of arrival of the first broadcasted message at the respective anchors and differences between times of arrival of the subsequent broadcasted message at the respective anchors; and
determine, using the processing unit, a geographic location of the movable object based on the differences between the times of arrival of the broadcasted message at the respective anchors, on relative positions of the anchors, and on the orientation of the movable object.

15. A localization system comprising:
a plurality of anchors disposed within or attached to a movable object, wherein each anchor is configured to receive broadcasted messages that contain a broadcast timestamps through an ultra-wideband communication channel; and
a processing unit configured to determine a geographic location of a movable based on differences between the times of arrival of the broadcasted messages at the respective anchors, on relative positions of the anchors and on a predetermined orientation of the movable object;
wherein the processing unit is further configured to discard a first broadcasted message if the broadcast timestamp of that broadcasted message deviates from a time reference by more than a predefined threshold; and
wherein, when the broadcast timestamp of the first broadcasted message deviates from the time reference by more than the predefined threshold, the processing unit is configured to determine the geographic location of the movable based on differences between times of arrival of a subsequent broadcasted message at the respective anchors, on the relative positions of the anchors, and on the predetermined orientation of the movable object.

16. The localization system of claim 15, wherein the time reference is an internal clock value of the processing unit.

17. The localization system of claim 15, wherein the processing unit is configured to derive the time reference from data received by the processing unit through an out-of-band communication channel.

18. A localization system comprising:
a plurality of anchors disposed within or attached to a movable object, wherein each anchor is configured to receive a broadcasted message through an ultra-wideband communication channel; and
a processing unit configured to:
periodically select one of said anchors as a master anchor for a time synchronization process between said anchors; and
determine a geographic location of the movable object based on differences between times of arrival of the broadcasted message at the respective anchors, on relative positions of the anchors, and on a predetermined orientation of the movable object.

19. A localization method comprising:
receiving, by a plurality of anchors disposed within or attached to a movable object, a first broadcasted message containing a broadcast timestamp through an ultra-wideband communication channel;
determining, using a processing unit of the localization system, that the first broadcast timestamp deviates from a time reference by more than a predefined threshold and discarding the first broadcasted message;
receiving, by the plurality of anchors, a subsequent broadcasted message containing a different broadcast timestamp through the ultra-wideband communication channel; and
determining, by the processing unit, a geographic location of the movable object based on differences between the times of arrival of the subsequent broadcasted message at the respective anchors, on relative positions of the anchors, and on a predetermined orientation of the movable object.

20. A localization method comprising:
receiving, by a plurality of anchors disposed within or attached to a movable object, a broadcasted message through an ultra-wideband communication channel;
selecting, by a processing unit of a localization system, one of the plurality of anchors as a master anchor for a time synchronization process between said anchors;
determining, by the processing unit, a geographic location of the movable object based on the differences between the times of arrival of the broadcasted message at the respective anchors, on relative positions of the anchors, and on a predetermined orientation of the movable object.

21. A computer program product comprising a non-transitory storage medium storing executable instructions that are configured, when executed by a processing unit of a localization system, to cause the localization system to:
receive, from a plurality of anchors disposed within or attached to a movable object, a first broadcasted message containing a broadcast timestamp through an ultra-wideband communication channel;
determine, using the processing unit, that broadcast timestamp of the first broadcasted message deviates from a time reference by more than a predefined threshold and discard the first broadcasted message;
receive, from the plurality of anchors a subsequent broadcasted message containing a different broadcast timestamp through the ultra-wideband communication channel; and
determine, using the processing unit, a geographic location of the movable object based on differences between the times of arrival of the subsequent broadcasted message at the respective anchors, on relative positions of the anchors, and on a predetermined orientation of the movable object.

22. A computer program product comprising a non-transitory storage medium storing executable instructions that are configured, when executed by a processing unit of a localization system, to cause the localization system to:
- receive, from a plurality of anchors disposed within or attached to a movable object, a broadcasted message through an ultra-wideband communication channel;
- selecting, using the processing unit, one of the plurality of anchors as a master anchor for a time synchronization process between said anchors;
- determine, using the processing unit, a geographic location of the movable object based on the differences between the times of arrival of the broadcasted message at the respective anchors, on relative positions of the anchors, and on a predetermined orientation of the movable object.

* * * * *